Figure 1:
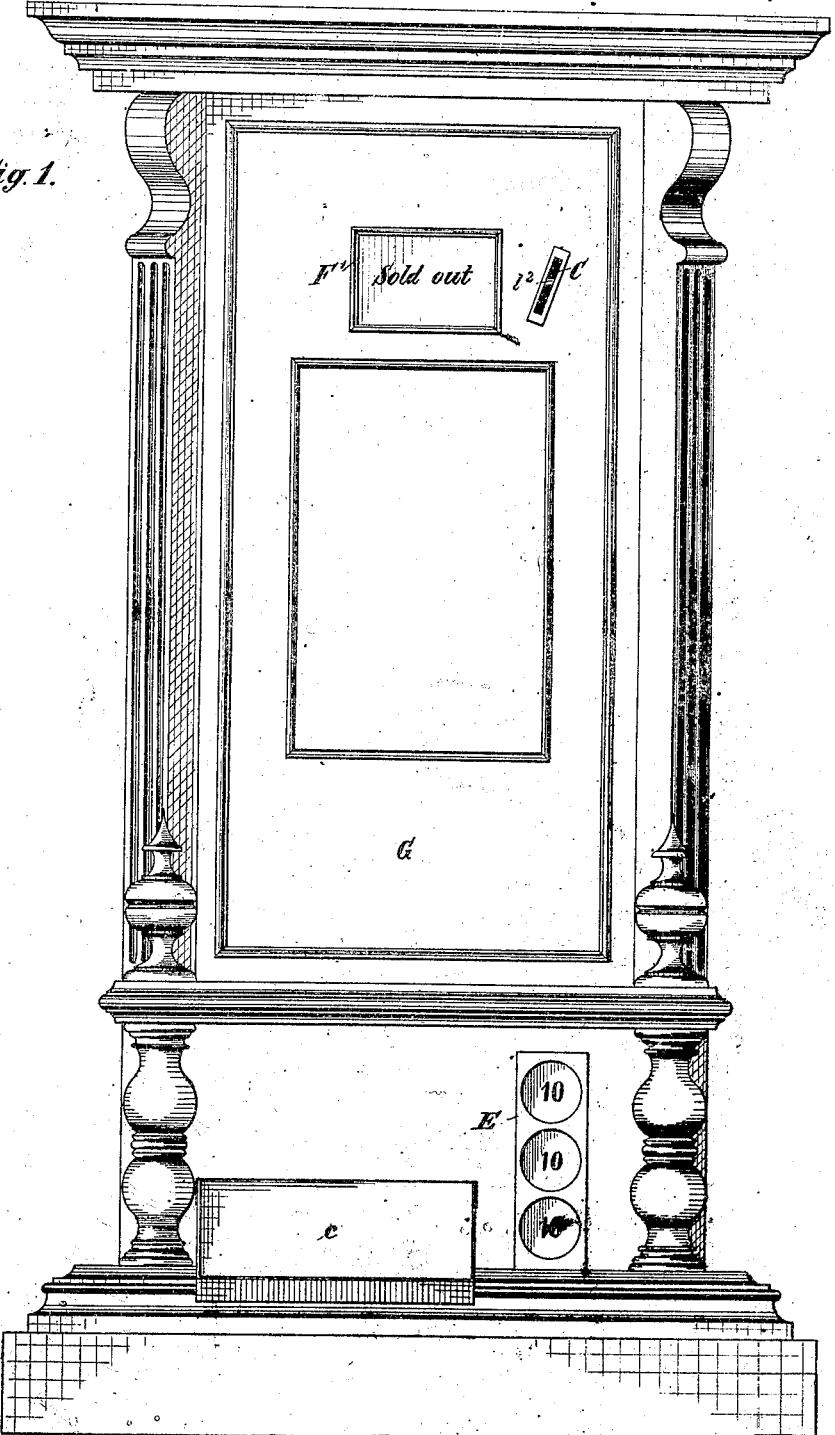

(No Model.) 6 Sheets—Sheet 1.
A. JUNGHANS.
APPARATUS FOR AUTOMATICALLY DELIVERING GOODS.
No. 392,037. Patented Oct. 30, 1888.

(No Model.) 6 Sheets—Sheet 2.

A. JUNGHANS.
APPARATUS FOR AUTOMATICALLY DELIVERING GOODS.

No. 392,037. Patented Oct. 30, 1888.

Witnesses:
J. A. Rutherford
Whet Everett

Inventor:
Arthur Junghans.
By James L. Norris.
Atty.

(No Model.)

A. JUNGHANS.
APPARATUS FOR AUTOMATICALLY DELIVERING GOODS.

No. 392,037. Patented Oct. 30, 1888.

(No Model.)  6 Sheets—Sheet 4.
A. JUNGHANS.
APPARATUS FOR AUTOMATICALLY DELIVERING GOODS.
No. 392,037. Patented Oct. 30, 1888.
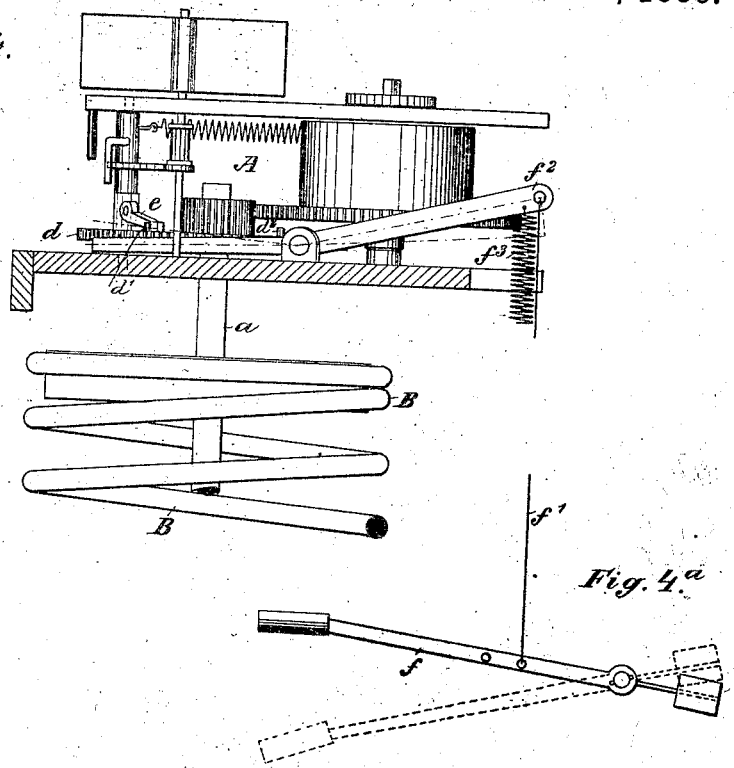
Fig. 4.
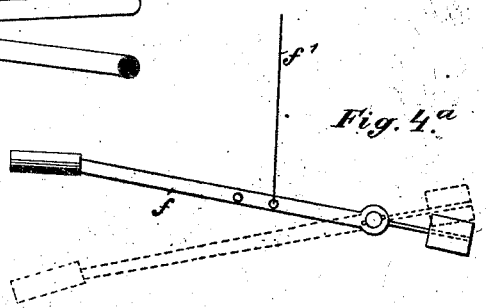
Fig. 4ª
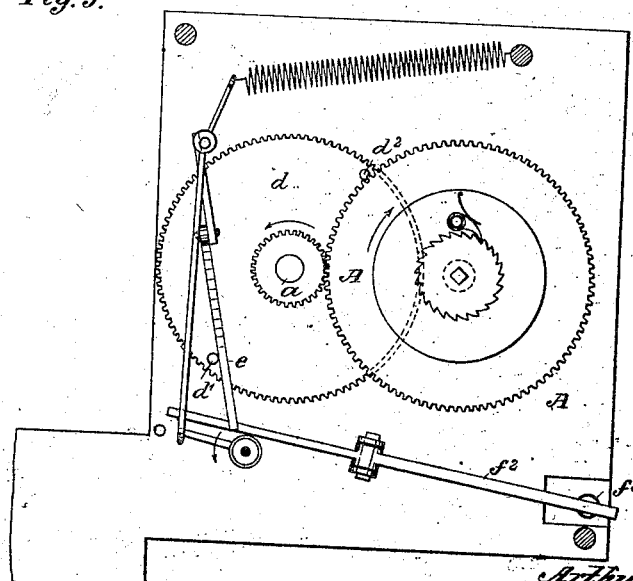
Fig. 5.
Witnesses.
Inventor.
Arthur Junghans
By James L. Norris (No Model.)  6 Sheets—Sheet 5.
A. JUNGHANS.
APPARATUS FOR AUTOMATICALLY DELIVERING GOODS.
No. 392,037.  Patented Oct. 30, 1888.
Fig. 7.
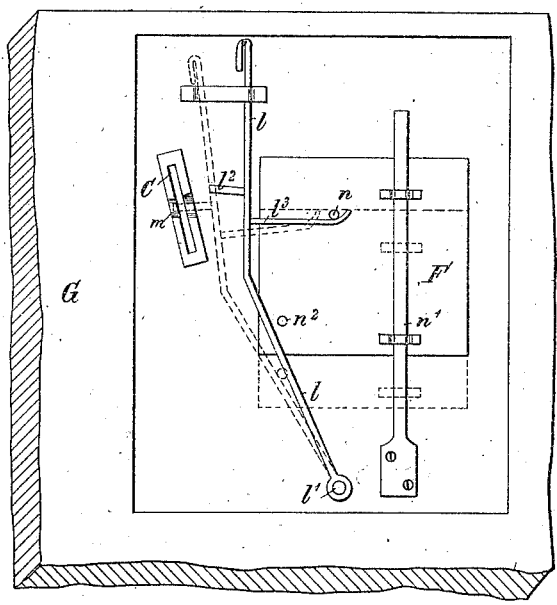
Fig. 8.
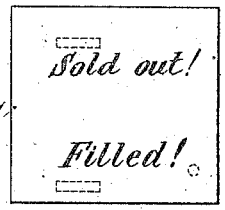
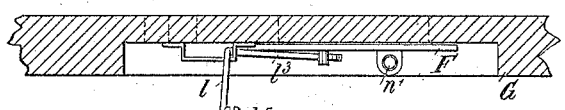
Fig. 6.
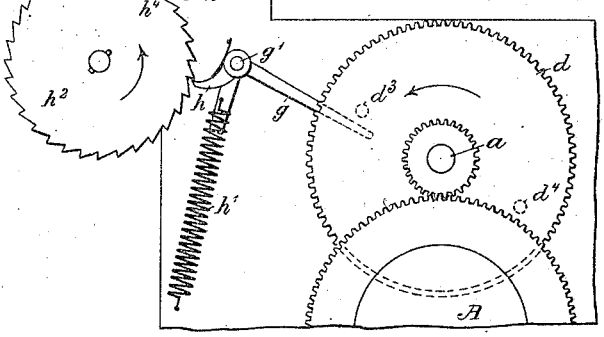
Witnesses.
J. A. Rutherford
Phil Everett
Inventor.
Arthur Junghans
By James L. Norris
Atty.

(No Model.) 6 Sheets—Sheet 6.
A. JUNGHANS.
APPARATUS FOR AUTOMATICALLY DELIVERING GOODS.
No. 392,037. Patented Oct. 30, 1888.
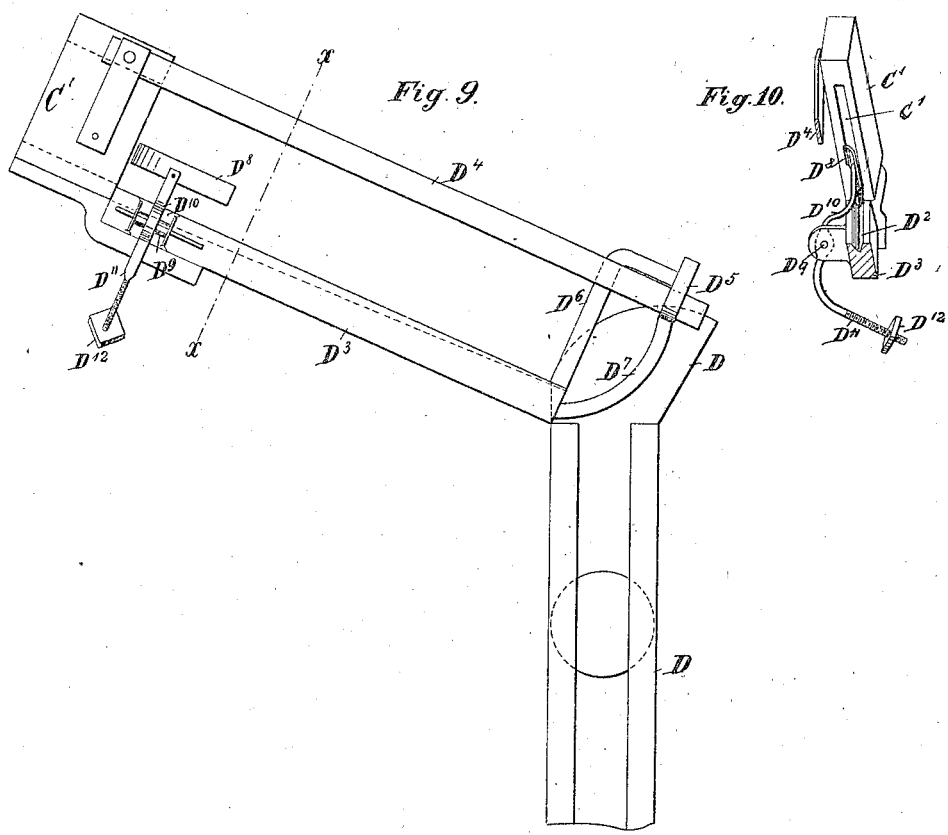
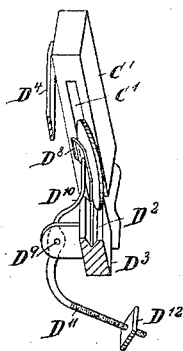

UNITED STATES PATENT OFFICE.

ARTHUR JUNGHANS, OF SCHRAMBERG, WÜRTEMBERG, ASSIGNOR TO GEBR. STOLLWERCK, OF COLOGNE-ON-THE-RHINE, GERMANY.

APPARATUS FOR AUTOMATICALLY DELIVERING GOODS.

SPECIFICATION forming part of Letters Patent No. 392,037, dated October 30, 1888.

Application filed February 23, 1888. Serial No. 264,988. (No model.)

*To all whom it may concern:*

Be it known that I, ARTHUR JUNGHANS, of the city of Schramberg, in the Kingdom of Würtemberg and German Empire, have invented a certain new and useful Improvement in Apparatus for the Automatic Delivery of Prepaid Goods, of which the following is a specification, reference being had to the accompanying drawings, and to the letters of reference marked thereon.

This invention relates to automatic delivery apparatus, and has for its object to provide apparatus of this kind with improvements by which both the purchaser of goods contained in the said apparatus is enabled to operate the latter more easily and in a simplified manner and the vender of the said goods is rendered more secure against fraudulent manipulations.

In the automatic apparatus as heretofore proposed for the delivery of prepaid goods the purchaser had in most cases to pull out a drawer, or the like, before he could put himself in possession of the article set free by the coin paid into the apparatus, while according to the present invention the prepaid article is delivered by the apparatus to the purchaser, so that the latter need but stretch out his hand to take hold of it. Most of the automatic delivery apparatus as heretofore employed were also found to be deficient, inasmuch as they allowed of being put in operation by any worthless counterfeit or by card-board or sheet-metal disks, provided that these counterfeits had but nearly or wholly the diameter and the approximate form of the genuine coin, which, according to the intentions of the seller, had to be placed into the apparatus as an equivalent for the article to be delivered. To remove this difficulty is another object of this invention, provision being made for preventing the counterfeit pieces from coming into contact with the operating mechanism and for exhibiting to the eye for a considerable length of time the coins which have acted in an operative manner upon the delivery mechanism of the apparatus.

Another object of the invention is to provide the apparatus with means to inform the purchaser and the seller of the fact that all of the articles placed in the apparatus have been sold out and to prevent the further insertion of coins in this event.

Figure 2:
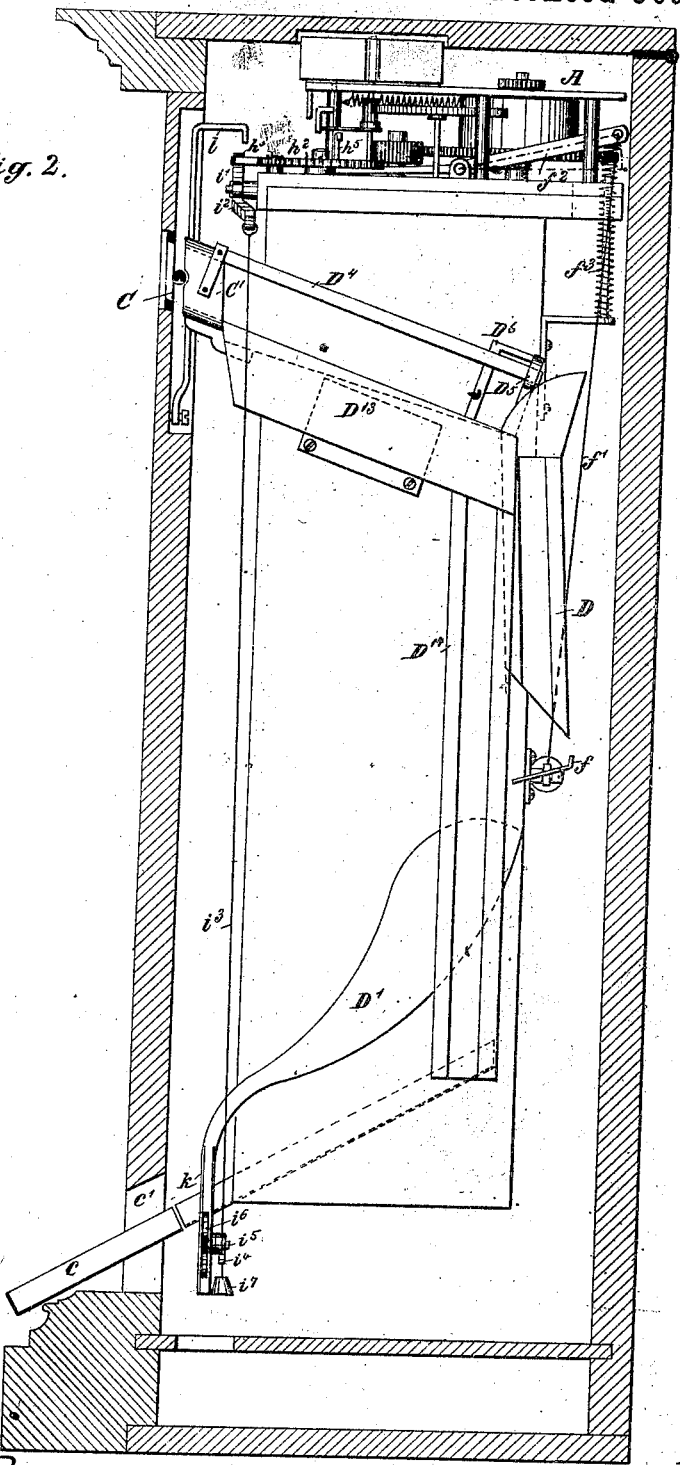

In the accompanying drawings, forming part of this specification, Figure 1 is a front elevation of my improved apparatus; Fig. 2 a side view, and Fig. 3 a front view, of the same, the casing of the apparatus being partly cut away and illustrated by section in these two last-named views; and Figs. 4, 4ª, 5, 6, 7, 8, 9, 10, and 11 illustrate details, which will be referred to explicitly in the following specification.

Figure 3:
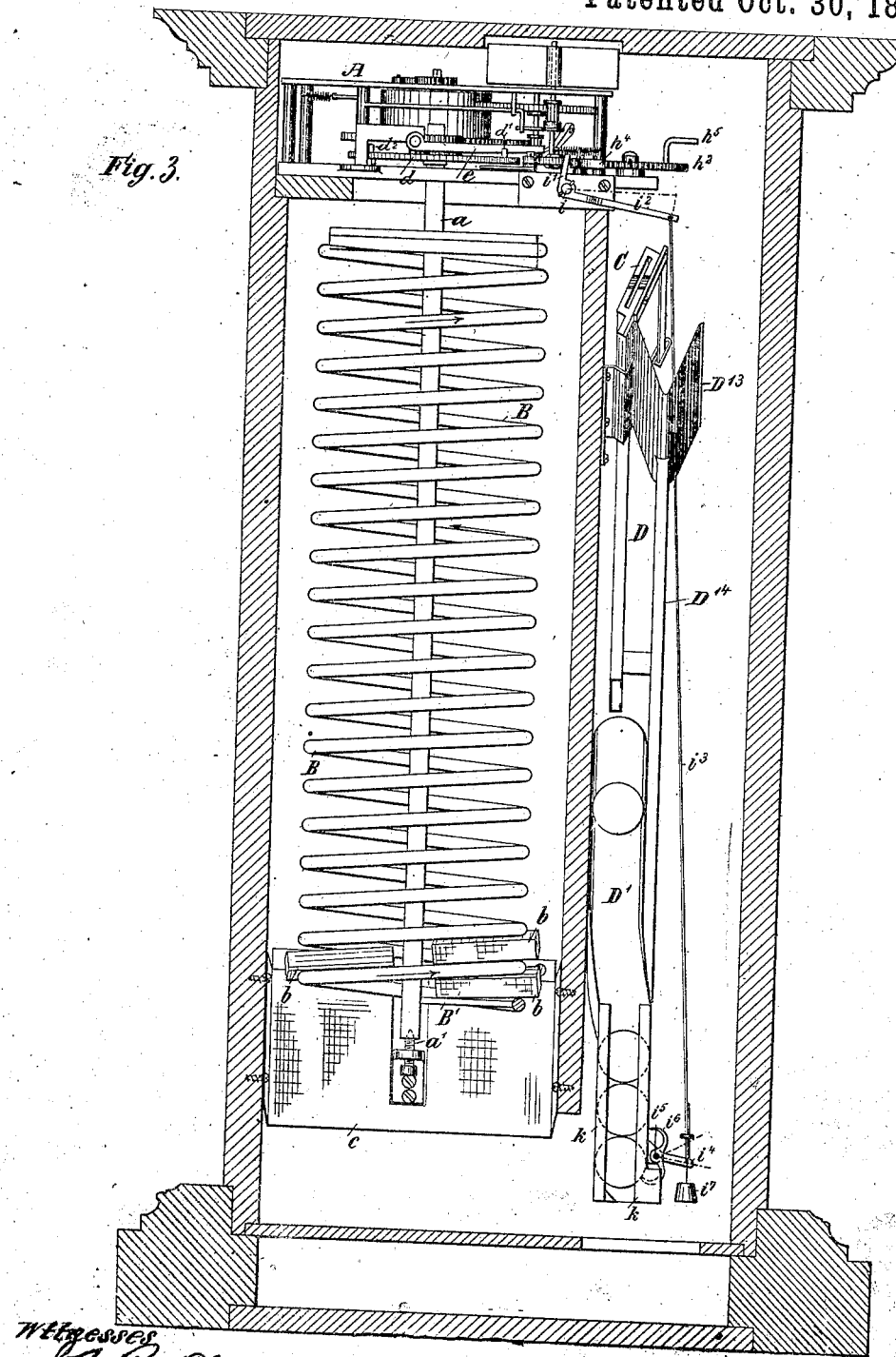

Referring to Figs. 2 and 3 of the drawings, A indicates a clock-work arranged at the upper part of the apparatus, and B a spiral of metal or other suitable material and fastened to the vertical shaft $a$ of the toothed wheel $d$ of the clock-work A. The shaft $a$ has its bearing upon the conical pivot $a'$, and the spiral B is arranged on the shaft so that there remains sufficient open space between its convolutions to allow of inserting between each convolution on the right and left hand side of the shaft $a$ an article to be sold or a package containing one or more of such articles—for instance, a package, $b$, full of chocolate or sweet-meat. At its lower end, B', the spiral B is cut away, so that on its being turned by the clock-work A in the direction indicated by the arrows the package $b$, resting lowermost, will be dropped by the spiral after half a revolution of the latter. The said package $b$ will drop down from the end B' of the spiral and slide out of the apparatus on the inclined plate $c$, extending through the slot $c'$ in the front wall of the apparatus. The packages or other articles delivered by the apparatus will thus be dropped upon the inclined plane $c$ alternately on the right and left hand side of the shaft $a$.

The pinion $d$, transmitting the required intermittent rotary motion to the shaft $a$, is retained in its normal position by the stop-lever $e$, Figs. 4 and 5, the front end of which will come to lie alternately in front of the pins $d'$ and $d^2$, inserted in the upper surface of the toothed wheel $d$. Thus it will be seen that the clock-work A can be rendered operative only after the one or the other of the pins $d'$, $d^2$ has come out of contact with the lever $e$. This is effected by means of the lever $f$, Fig. 4ª, which is connected with the elbow-lever $f^2$ by means of a wire, $f'$, and depressed by a coin inserted through the slot C, Figs. 1, 2, and 3, and dropping upon the end of the long arm of the lever $f$, which will cause the lever $f^2$ to be pulled down at its end connected with the wire $f'$ and to be raised at its other end which underlies the stop-lever $e$, and the latter will thus be lifted out of contact with the pin $d'$ or $d^2$, respectively. The pinion $d$ will then be free to rotate and turn the shaft $a$, with its spiral B, until its motion is arrested again by one of its pins $d'$ or $d^2$ striking against the lever $e$, which will drop down upon the surface of the pinion $d$ by its own gravity shortly after it has been raised by the lever $f^2$, the latter being pushed upward again at its rear end by the spiral spring $f^3$, and lowered at its forward end immediately after the lever $f$ has been freed of the coin, which has rested upon the lever $f$ only just for a moment and then fallen down into the guide D′, leading to the cash-box. The pin $d'$ being arranged diametrically opposite to the pin $d^2$, it follows that the movement of the pinion $d$ will always be arrested again after shaft $a$ and the spiral B have made half a revolution, and that consequently with this arrangement of apparatus for each coin paid into the apparatus one package of chocolate or other article will be delivered; but it will be seen that by removing one of the pins $d'$ $d^2$ the spiral would make an entire revolution and the same apparatus deliver two packages for each coin received, and that by inserting two more pins between the pins $d'$ $d^2$ the spiral B would make but a quarter of a revolution and the same apparatus require two coins before it would deliver one package or article.

In order to prevent purchasers from manipulating fraudulently with the apparatus, an improved device for assorting the good and bad coins has been inserted between the slot C, through which the coins are introduced into the apparatus by the purchaser, and the lever $f$ by which the apparatus is put in operation, Fig. 2. Figs. 9, 10, and 11 of the drawings illustrate this improved assorting device, respectively, in side view and transverse sections on the line $x\ x$. The same is made, preferably, of galvanized iron or other metal, and consists of the entrance-slot C′, a bar, D³, having the groove D², and a rail or flat bar, D⁴, of sheet iron or other suitable light material, pivotally connected with the body containing the slot C′ and resting with its free end on an extension, D⁵, of a support, D⁶, rising from the end of the bar D³. The whole is arranged in a laterally-inclined position, as shown. The groove D² is constructed so that the pieces of money of the proper value will be just in contact with the rail D⁴, while the thinner pieces will enter the groove deeper, and although they may be of the same diameter as the genuine ones they will not be guided by the rail, so that they will tumble over sidewise and fall from underneath the rail on a receiving-trough, D¹³, Fig. 3, arranged underneath the bar D³ and leading the bad pieces into a conduit, D¹⁴, whereby they will be delivered into the cash-box in the lower part of the apparatus, a clogging of counterfeit pieces between the bar D³ and the rail being prevented by the pivotal arrangement of the latter. The good pieces will roll along the rail D⁴ and enter the conduit D at the end of the latter, which will conduct them to the operating mechanism—that is to say, upon the end of the lever $f$, Fig. 2, whose function has been already explained.

It will be seen that in an automatic delivery apparatus provided with an assorting device constructed as so far described the operation of the actuating and delivery mechanism would be effected by such genuine or counterfeit pieces only having just exactly the diameter, shape, and thickness of the coin intended by the vender to operate the said mechanism; but in order to eliminate also those pieces which may have just exactly the dimensions and the outlines of the proper genuine pieces, but which are of smaller weight than the latter, the bent lever D¹⁰, having the flap D⁹, Figs. 9, 10, and 11, is arranged a short distance behind the entrance-slot C′, the said flap in its normal position being in line with the said slot and above the groove D². The lever D¹⁰ is journaled on a pivot, D⁹, in a bracket on the side of the bar D³, and its lower arm, D¹¹, carries a counterweight, which in the device illustrated in the drawings consists of an adjustable nut, D¹², screwed upon the threaded end of the arm D¹¹. The counter-weight or nut D¹² is adjusted on the extension D¹¹, so that the flap D⁹ will recede or fall back under the weight of the passing coins having the proper weight of the genuine pieces, while the pieces of smaller than the required weight—such as card-board disks, marks, or the like—will be thrown off from the bar D³ by the counterbalanced flap D⁸, as indicated in Fig. 11 of the drawings, and drop down upon the trough D¹³. By these means all the pieces short of weight will be eliminated immediately behind the entrance-slot, while the pieces of full weight, but not of the proper diameter, shape, or thickness, will drop off from underneath the rail D⁴ to the opposite side, so that neither of them can have any actuating effect upon the delivery mechanism of the apparatus, as will be readily understood.

I will now proceed to describe the mechanism for exhibiting to the eye of the public for a considerable length of time the pieces which have acted in an operative manner upon the delivery mechanism, and for informing the public or the vender that the articles stored for sale in the apparatus have been sold out, and preventing in this case the further introduction of coins into the slot C.

Referring to Fig. 6 of the drawings, which represents the toothed wheel $d$ as seen from below, $d^3$ $d^4$ are two pins inserted in the lower surface of the pinion $d$ and striking alternately against, and thus imparting motion to, a lever, $g$, always a short time before the spiral B has completed its half of a revolution. The lever $g$ is fixed upon a pivot, $g'$, which carries the pawl $h$ in contact with the ratchet-wheel $h^2$, so that when the lever $g$ is turned in the direction of the arrow by the pin $d^3$ or $d^4$, as the case may be, it will transmit rotary motion to the pivot $g'$ and its connected pawl $h$, which will turn the ratchet-wheel $h^2$ for the distance of one tooth. Immediately after the pin $d^3$ or $d^4$ has passed out of contact with the lever $g$ the latter will be returned into its normal position again by the retracting-spring $h'$ acting upon the pawl $h$ and turning the latter with its connected pivot $g'$ back into their former positions. The teeth of the ratchet-wheel $h^2$ are entered also by the pawl $h^4$, having the lever $h^5$ and being journaled upon the pin $h^3$, and it will be noticed that this pawl $h^4$ will be raised by the teeth of the wheel $h^2$ at each intermittent motion of the latter. The lever $h^5$ will then be brought to bear against the short arm of the angular lever $i'$, journaled on the pivot $i$, Fig. 3, which will cause the long arm $i^2$ of the lever $i'$ to be moved in an upward direction. The end of the long arm $i^2$ is connected with a lever, $i^4$, by means of the wire $i^3$, and the lever $i^4$ is fixed upon a pivot, $i^5$, carrying the arresting cut-off $i^6$, so that the latter will be swung out sidewise after each half-revolution of the spiral B by the lever-arm $i^2$, the wire $i^3$ and the lever $i^4$ being raised in the manner just described. The said parts are returned into their normal positions and the pawl $h^4$ brought into contact with the teeth of the ratchet-wheel $h^2$ again by the weight $h^7$, applied to the free end of the lever $i^4$, as will be readily understood. The hooks of the cut-off $i^6$ enter laterally into guiding-grooves $k$, arranged underneath the conduit D', into which the coin, having acted upon the lever $f$, will drop from the latter. This coin upon entering between the guides $k$ will be grasped by the lower hook of the cut-off $i^6$ and be retained by the latter until the spiral B has nearly completed its partial revolution caused by the said coin, when the lever $i^4$ will be raised in the manner before described and the coin be released from the clutch turned sidwise, so that it is now free to drop out of the guiding-grooves and fall into a suitable receiver or cash-box arranged in the lower part of the apparatus. The guiding-grooves $k$ are arranged in such a manner that the coin therein retained by the cut-off $i^6$ can be seen from the outside through a window, E, Fig. 1, which arrangement will allow of detecting at a glance whether bad money has been used for the purchase of one of the articles for sale. In order to present to the eye for a considerable length of time the pieces which have had an operating effect upon the delivery mechanism, three or more windows E should be provided, and two or relatively more coins be inserted between the guiding-grooves $k$ before the apparatus is closed and presented to the public. The lowermost of the coins inserted will then be retained by the cut off $i^6$, as above described, until a coin dropping upon the lever $f$ will cause the spiral B to make a partial rotation, whereupon the lower hook of the cut-off $i^6$ will release the said lowermost coin, while the upper hook of the clutch will retain the next coin above until the clutch has been returned into its normal position again by the action of the weight $i^4$. The coin held by the upper clutch-hook will then drop down upon the lower hook, so that by these means the operating-coin will remain visible from the outside to any one during three delivery periods, and thus there will be much better chances than heretofore to detect a cozener in the very act of defrauding. The number of the teeth of the ratchet-wheel $h^2$ is made to correspond to the number of partial revolutions necessary to be imparted to the spiral B from the time of lining the latter with the articles to be sold up to the sale of the last article therein contained, this arrangement being made for the purpose of causing the slot C for the insertion of the coins to be closed automatically, and for acquainting the public with the fact that all the salable articles in the apparatus have been sold out by presenting to view, likewise in an automatic manner, the words "Sold out" of a sign-board F, Figs. 6, 7, and 8, containing the words "Sold out" and "Filled." To this end the ratchet-wheel $h^2$ has been provided with an arm, $h^6$, which, after the spiral B has been lined with goods, is adjusted so that it will be immediately behind the upper horizontal extension of a rod, $l$, pivoted at $l'$ to the door G of the apparatus and provided with a bolt, $l^2$, arranged to enter a groove, $m$, just behind the slot C. The rod $l$ has also the arm $l^3$, and upon the latter rests a pin, $n$, fixed to the rear side of the sign-board F, the front of which is shown in Fig. 8. When the pin $n$ rests upon the arm $l^3$, the sign F will present to the purchasers the word "Filled," this position being represented in Figs. 6 and 7 of the drawings. It will be seen from Fig. 6 that the arm $h^5$ has just arrived in front of the upper horizontal extension of the rod $l$, which would prove that the ratchet-wheel $h^2$ is just completing one full revolution and that the next coin actuating the delivery mechanism will remove the last article from the apparatus. At the same time the arm $h^5$ will come in contact with the rod $l$ and push the latter aside, which will cause the arm $l^3$ to be withdrawn from under the pin $n$, and the sign-board F, guided on the bar $n'$, to drop down until its pin $n^2$, arranged below the pin $n$, will come to bear upon the rod $l$. The bolt $l^2$ will be pushed behind the slot C, and the dropped sign F present to the public the words "Sold out." This position is shown in dotted lines in Fig. 7. Fig. 1 shows the same position, the sign-board presenting the words "Sold out" through the open space F' in the door and the bolt $l^2$ barring the slot C and preventing the insertion of more coin.

Having thus described my invention, what I claim as new, and desire to secure by Letters Patent, is—

1. In an apparatus for the automatic delivery of prepaid goods, the combination, with a motor intermittently operated by a coin acting upon one of a series of levers connected therewith and operating substantially as described, of a shaft carrying a spiral, B, whose pitch corresponds to one dimension of the articles to be placed for sale between its several convolutions, the lowermost of which is cut away, so that one of the articles is discharged from the lower end of the spiral after each half-revolution of the latter, substantially as and for the purpose specified.

2. In an automatic delivery apparatus, the combination, with a clock-work intermittently operated by a coin acting upon one of a series of levers connected therewith and operating substantially as described, of the shaft $a$ and the spiral B, surrounding the latter, the pitch of the said spiral corresponding to one dimension of the articles for sale and its lowermost convolution, B', being cut away, substantially as described, for the purpose specified.

3. In an automatic delivery apparatus, the clock-work A, having the pinion $d$, carrying one or more pins, $d'\, d^2$, the stop-lever $e$, the lever $f^2$, and the coin-operated lever $f$, connected therewith, in combination with the shaft $a$ and its surrounding spiral B, whose pitch corresponds to one dimension of the articles for sale, while it is cut away sharp at its lowermost convolution, B', substantially as and for the purpose specified.

4. In an automatic delivery apparatus, a casing provided with an inclined entrance-slot for the reception of the inserted coin, in combination with a pivotally-arranged lever having a flap immediately behind the said slot and in the path of the rolling coin, and an adjustable counter-weight for controlling the position of the said flap, so that it will allow the pieces of full weight only to continue their course, while those short of weight are diverted sidewise and automatically thrown out of their course, substantially as and for the purpose specified.

5. In an automatic delivery apparatus, the combination, with a guide for the coin on its way to the cash-box and one or more windows in front of the said guide, of a cut-off having a lever provided with a counter-weight and connected with an angular or elbow lever, a pawl having a lever for raising the angular lever, a ratchet-wheel in gear with the said pawl, a driving-pawl transmitting intermittent rotary motion to the said ratchet-wheel, and a pinion intermittingly rotated by the motor of the apparatus and carrying pins for actuating the said driving-pawl, substantially as and for the purpose specified.

6. In an automatic delivery apparatus, the combination, with the clock-work A and the spiral B, of the conduits D and D', the guide $k$, cut-off $i^5$, lever $i^4$, counter-weight $i^7$, connecting-rod $i^3$, angular lever $i^2$, lever $i^1$, pawl $h^4$, ratchet-wheel $h^2$, driving-pawl $h$, pinion $d$, and pins $d^3\, d^4$, substantially as and for the purpose specified.

7. In an automatic delivery apparatus, the combination, with a ratchet-wheel having an arm, $h^5$, and teeth corresponding in number to the number of articles to be sold by the apparatus, of a rod, $l$, pivotally connected with the casing of the apparatus and having a laterally-projecting bolt for registering with the coin-receiving slot in said casing, substantially as and for the purpose described.

8. In an automatic delivery apparatus, the combination, with a ratchet-wheel having an arm, $h^5$, and teeth corresponding in number to the number of articles to be sold by the apparatus, of a rod, $l$, pivotally connected with the casing of the apparatus, and a laterally-projecting arm, $l'$, upon said rod, and a sliding signboard having the pin $n$ sustained by said projecting arm, substantially as and for the purpose specified.

In testimony whereof I have signed my name to this specification in the presence of two subscribing witnesses.

ARTHUR JUNGHANS.

Witnesses:
LUDWIG STOLLWERCK,
GUSTAVE ALBERT OELRICHS.